(12) United States Patent
Hockings et al.

(10) Patent No.: US 9,350,739 B2
(45) Date of Patent: *May 24, 2016

(54) RECOVERY FROM ROLLING SECURITY TOKEN LOSS

(71) Applicant: International Business Machines Corporation, Armonk, NY (US)

(72) Inventors: Christopher J. Hockings, Burleigh Waters (AU); Trevor S. Norvill, Parkwood (AU); Philip A. Nye, Southport (AU); Asha Shivalingaiah, Upper Coomera (AU); Patrick R. Wardrop, Austin, TX (US); Shane B. Weeden, Paradise Point (AU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/683,266

(22) Filed: Apr. 10, 2015

(65) Prior Publication Data

US 2016/0080383 A1   Mar. 17, 2016

Related U.S. Application Data

(63) Continuation of application No. 14/483,216, filed on Sep. 11, 2014.

(51) Int. Cl.
*H04L 9/32* (2006.01)
*H04L 29/06* (2006.01)

(52) U.S. Cl.
CPC .............. *H04L 63/10* (2013.01); *H04L 9/3213* (2013.01); *H04L 63/08* (2013.01); *H04L 63/083* (2013.01); *H04L 63/0846* (2013.01); *H04L 63/166* (2013.01); *G06F 2221/2137* (2013.01)

(58) Field of Classification Search
CPC ... H04L 63/0807; H04L 63/08; H04L 9/3213; H04L 63/108; G06F 2221/2137
See application file for complete search history.

(56) References Cited

U.S. PATENT DOCUMENTS 8,533,796 B1* 9/2013 Shenoy ............... H04L 63/0815
380/229
2005/0021613 A1* 1/2005 Schmeidler ............. G06F 21/10
709/203

(Continued)

OTHER PUBLICATIONS

D. Hardt, Ed., "The OAuth 2.0 Authorization Framework", Oct. 2012, Internet Engineering Task Force (IETF), Request for Comments: 6749, retrieved from the Internet <http://tools.ietf.org/pdf/rfc6749.pdf>, retrieved on Feb. 18, 2016.*

(Continued)

*Primary Examiner* — Farid Homayounmehr
*Assistant Examiner* — Zhimei Zhu
(74) *Attorney, Agent, or Firm* — Cantor Colburn LLP; Steven Kurlowecz

(57) ABSTRACT

An aspect of recovery from rolling security token loss includes storing, in a memory device accessible by a server computer, a token pair (B) transmitted to a client device. The token pair (B) includes an access token (a2) and a refresh token (r2) and is generated as part of a refresh operation. An aspect also includes storing, in the memory device, a refresh token (r1) that was generated by the server computer before generation of the token pair B. The refresh token (r1) and the refresh token (r2) are each tagged as a valid refresh token. An aspect further includes receiving, at the server computer, a request to access a network resource that includes the access token (a2), invalidating the refresh token (r1), and providing the client device with access to the network resource.

7 Claims, 4 Drawing Sheets

(56) References Cited

U.S. PATENT DOCUMENTS

| | | | | |
|---|---|---|---|---|
| 2013/0054968 A1* | 2/2013 | Gupta | H04L 63/0428 | 713/168 |
| 2013/0339731 A1* | 12/2013 | Rowles | H04L 63/0807 | 713/168 |
| 2014/0149285 A1* | 5/2014 | De | G06Q 20/3276 | 705/41 |
| 2014/0189799 A1* | 7/2014 | Lu | H04L 63/08 | 726/4 |
| 2014/0223516 A1* | 8/2014 | Vongsouvanh | H04L 63/0492 | 726/4 |
| 2014/0230020 A1* | 8/2014 | Mogaki | H04L 63/10 | 726/4 |
| 2015/0341347 A1* | 11/2015 | Kong | H04L 63/0853 | 726/4 |
| 2015/0350186 A1* | 12/2015 | Chan | H04L 67/2842 | 726/9 |

OTHER PUBLICATIONS

List of IBM Patents or Patent Applictions Treated as Related; (Appendix P), Filed Apr. 10, 2015, 2 pages.

Christopher C. Hockings, et al., Pending U.S. Appl. No. 14/483,216 entitled "Recovery From Rolling Security Token Loss," filed with the U.S. Patent and Tradmark Office on Sep. 11, 2014.

* cited by examiner

RECOVERY FROM ROLLING SECURITY TOKEN LOSS

DOMESTIC PRIORITY

This application is a continuation of U.S. patent application Ser. No. 14/483,216, filed Sep. 11, 2014, the content of which is incorporated by reference herein in its entirety.

BACKGROUND

The present disclosure relates generally to network security and, more specifically, to recovering from rolling security token loss in an unreliable network.

A client, such as an application implemented on a mobile device, can contain paired security tokens for accessing a resource, in which one token in the pair is a short-lived token for the access (also referred to as an access token) and the second token in the pair is a single-use token (also referred to as a refresh token) for refreshing the access token. This implementation is common, e.g., when mobile applications use Open Authorization (OAuth) standard, which pairs the refresh token and the access token together as part of a grant. However, when this pair is delivered over an unreliable network, credential continuity can be lost, e.g., when a new token pair is generated by a server but the token pair is never received by the client. A network may be deemed unreliable, e.g., when it incurs intermittent network unavailability.

Among other consequences, the loss of continuity can result in a requirement that the client re-register for access to the server, which involves interactions between a device client and a help desk of the server.

SUMMARY

Embodiments include a method for providing recovery from rolling security token loss. A method includes storing, in a memory device accessible by a server computer, a token pair (B) transmitted to a client device. The token pair (B) includes an access token (a2) and a refresh token (r2) and is generated as part of a refresh operation. The method also includes storing, in the memory device, a refresh token (r1) that was generated by the server computer before generation of the token pair B. The refresh token (r1) and the refresh token (r2) are each tagged as a valid refresh token. The method further includes receiving, at the server computer, a request to access a network resource that includes the access token (a2), invalidating the refresh token (r1), and providing the client device with access to the network resource.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Recovery from rolling security token loss in an unreliable network and associated risk management features are provided. The embodiments include managing token pairs used in providing access to various resources. Token pairs are generated by an entity that manages the resources and the token pairs are transmitted to client devices over a network. A refresh token of a token pair that is presented by the client for the first time to the entity is maintained in storage by the entity along with the most recently issued and transmitted refresh token by the entity (also referred to as the most recently generated/issued refresh token) for the client. Requests from a client to access a resource of the entity (which requests include an access token), and refresh flows by the client (which include a refresh token) may be evaluated by the entity, and the entity performs one or more functions based on the evaluation, such as providing access to the resource when a valid access token is presented, generating a new/refreshed token pair as part of refresh flows, and invalidating previously maintained refresh tokens when a refresh flow is determined. The entity may also log events occurring between the client and the entity and perform risk analysis based on the events. These and other features of the embodiments will now be described.

Figure 1:
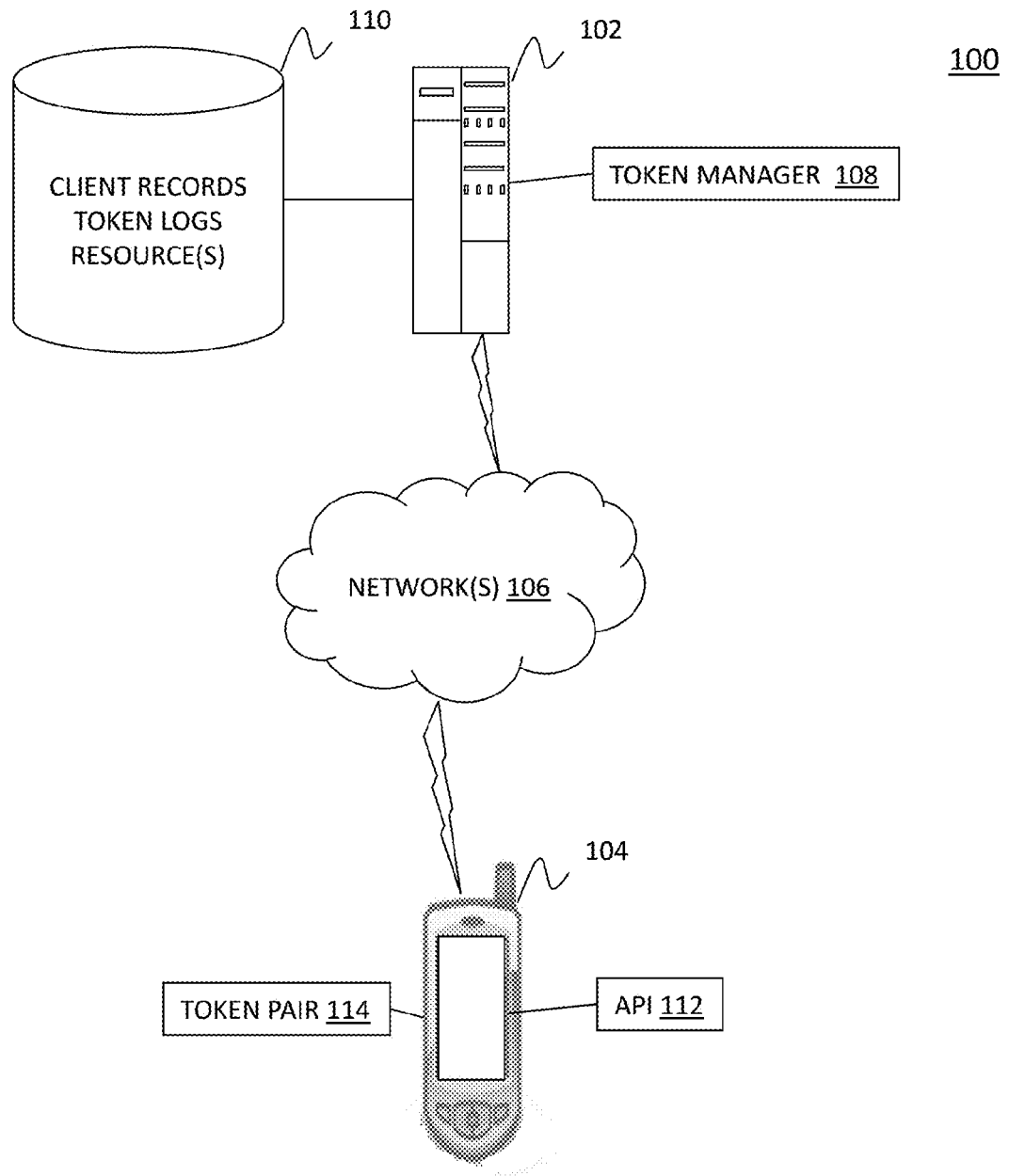
FIG. 1 illustrates a system for providing recovery from rolling security token loss and associated risk management in accordance with an embodiment.

Referring to FIG. 1, a system 100 for providing recovery from rolling security token loss and associated risk management in accordance with an embodiment is generally shown. The system 100 includes a server computer 102 and a client device 104, each of which is communicatively coupled to one or more network(s) 106.

The server computer 102 may be implemented as a high-speed computer processing device capable of handling a large volume of activities from end users, such as a user of the client device 104. The server computer 102 may be implemented by an entity that provides one or more network-based resources to the end users. For example, in one embodiment, the server computer 102 may be operated by a banking institution, and the end users may be its banking customers. In this embodiment, one network resource offered by the server computer 102 may be a database of customer account information pertaining to an end user. Another resource may be an online transaction tool that enables the end users to perform functions such as transfer funds, purchase items, and pay bills, to name a few.

The server computer 102 may provide access to certain of its databases based on an authentication scheme. The server computer 102 executes a token manager application 108 for performing the authentication. In an exemplary embodiment, the token manager application 108 is configured to address authentication functions that occur over unreliable networks and to perform risk assessment functions, as will be described further herein.

The databases may be stored in a memory device, or storage device 110, as illustrated in FIG. 1. The storage device 110 may store client records of its customers or end users, token logs, and various resources for access by authorized end users. The storage device 110 may be internal to the server computer 102 or may be physically coupled (e.g., using cabling) to the server computer 102. In an alternative embodiment, the storage device 110 may be communicatively coupled to the server computer 102 over one or more of the networks 106. It will be understood that multiple storage devices may be implemented, each of which storing one or more databases used by the server computer 102 for implementing the embodiments described herein. For example, the storage device 110 may be geographically dispersed units that are logically addressable as a consolidated data source across multiple networks.

The client device 104 may be implemented as a mobile or portable computer processing device. For example, the client device 104 may be a tablet PC or smart phone.

The server computer 102 may provide a customized application (API) 112 for use by the end user client device 104 in accessing resources provided by the server computer 102. In an embodiment, the server computer 102 generates a token pair that contains a refresh token and an access token. The token pair is short-lived and may be configured for use with an expiration time commensurate with an average amount of time typically consumed by the end user at the server computer 102 resource. For example, in the banking scenario, an average end user may spend 10 minutes or less in an account database. It will be understood that the expiration time may be a tunable parameter of any length of time that is desired by the entity.

Once generated, the server computer 102 sends the token pair to the client device over the network(s) 106. As shown in FIG. 1, the token pair 114 is stored on the client device 104.

The networks 106 may include any type of network implementations known in the art. In an embodiment, the networks 106 include cellular and/or satellite networks.

As indicated above, embodiments described herein include managing token pairs used in providing access to various resources. The opportunity for reuse of an old token is diminished since an older presented token pair becomes invalidated as soon as the system determines that a newer token has been received from the client device 104. Risk analysis, which is described further in FIG. 3, enables the system to identify potential risks involved with refresh operations that use the same refresh token despite recurrent refresh operations performed.

Figure 2:
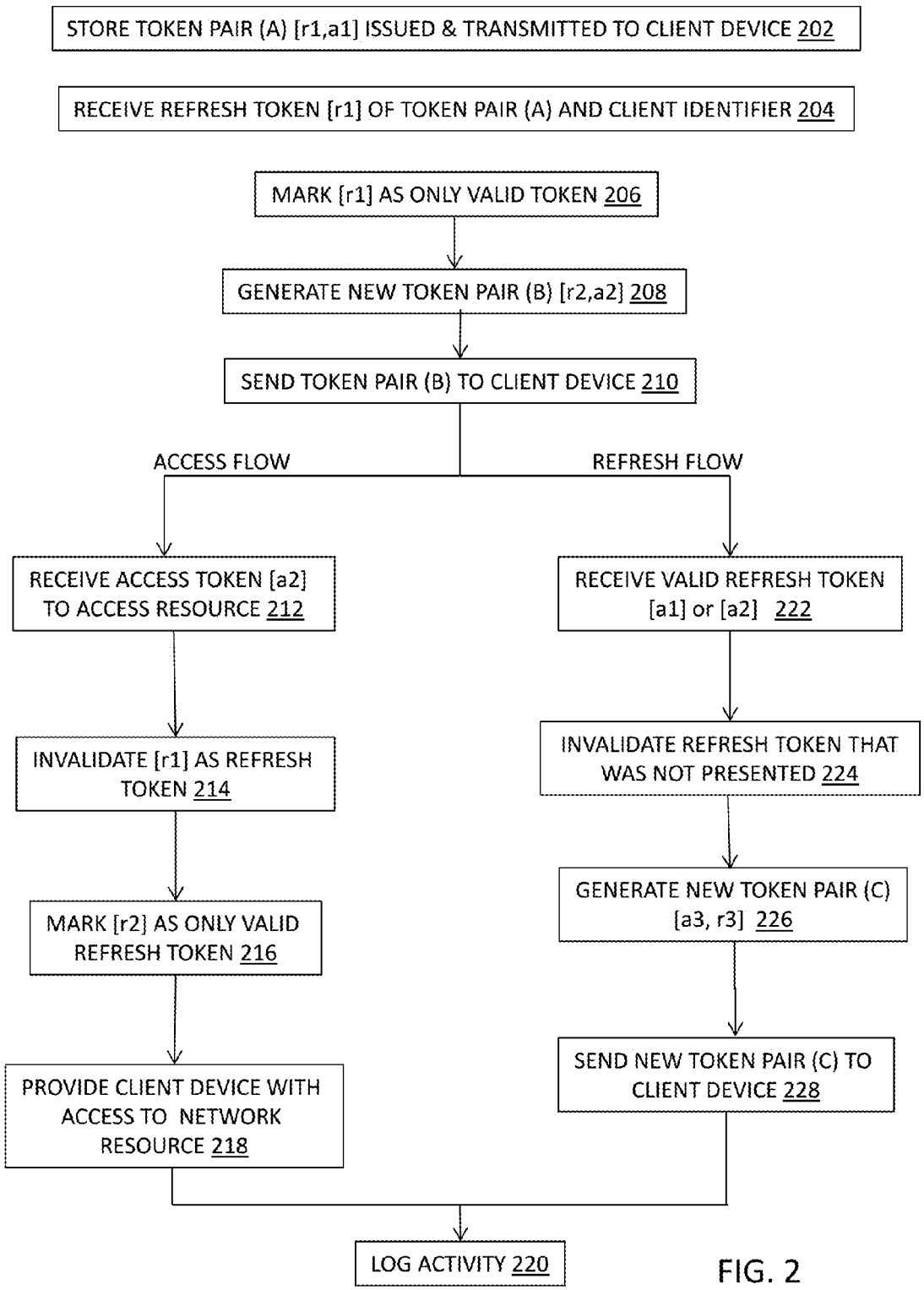
FIG. 2 is a flow diagram illustrating a process for providing recovery from rolling security token loss in accordance with an embodiment.
Figure 3:
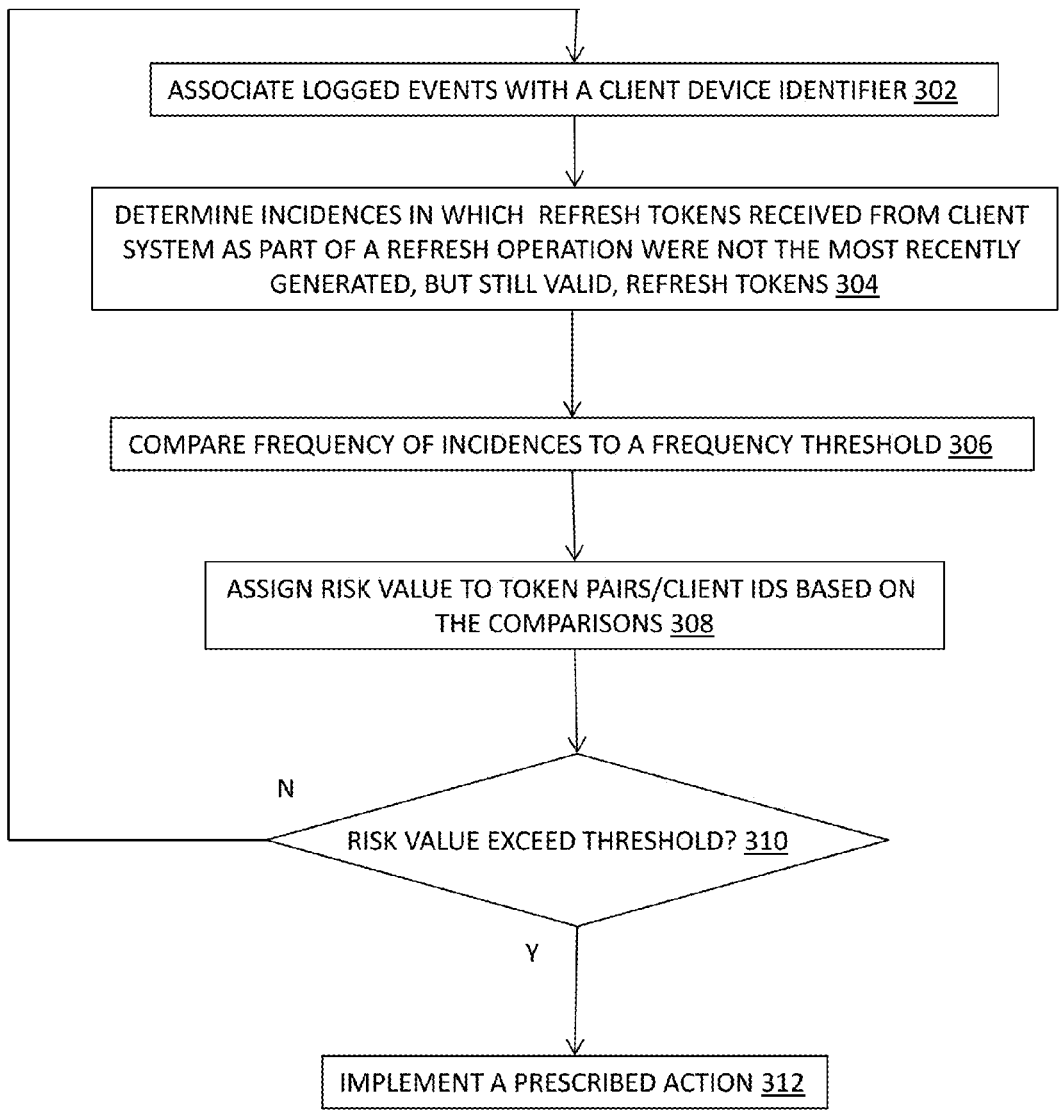
FIG. 3 is a flow diagram illustrating a process for providing risk assessment from functions logged in FIG. 2 in accordance with an embodiment.

Turning now to FIGS. 2 and 3, flow diagrams describing a process for providing recovery from rolling security token loss and associated risk management will now be described. FIG. 2 illustrates an embodiment in which use of an access token by the client device invalidates an older refresh token, if any, as well as the effects a refresh flow (and potentially, a refresh flow loop) has on the handling of two pending, valid refresh tokens. FIG. 3 illustrates a process of capturing data from the functions performed in FIG. 2 for use in performing risk analysis.

The process described in FIGS. 2 and 3 assumes that a user of the client device 104 has registered with the server computer 102 and has received a token pair (A) that includes a refresh token r1 and an access token a1, which are referred to herein as [r1, a1].

At block 202, the token manager 108, via the server computer 102, stores the token pair (A) in the storage device 110. When a resource is desired by the client device 104, the client device 104 performs a refresh flow, which includes sending the refresh token [r1] and a client identifier (or application identifier) to the server computer 102.

At block 204, the token manager 108 receives the refresh token [r1] of the token pair (A), which is the first time the refresh token [r1] has been presented to the server computer 102. The token manager 108 may also receive the identifier from the client device 104. In an embodiment, at block 206, the token manager 108 marks the refresh token [r1] as the only valid refresh token for the client device 104. This may be implemented by a flag or a set bit, or other indicator in the token log. In addition to, or in lieu of, making the refresh token [r1] as the only valid refresh token, the token manager 108 may invalidate any other refresh tokens besides the [r1] refresh token for the client device.

At block 208, as part of a refresh operation, the server computer 102 generates a new token pair (B) that comprises an access token [a2] and a refresh token [r2]. At block 210, the token manager 108 transmits the token pair (B) to the client device 104. As it is unknown to the server computer 102 whether the delivery of token pair (B) is successful, the token manager 108 maintains both refresh token [r1] and refresh token [r2] as valid refresh tokens for use by the client device 104 in a refresh flow operation.

At this time, the client device 104 may engage in a short-lived session with the desired network resource. Otherwise, if the client device 104 does not utilize the short-lived session within a set period of time, the client device 104 may later refresh the token pair before obtaining access to the resource. The first scenario is described in blocks 212-218, and the second scenario is described in blocks 222-228, as will now be described.

The client device 104 may engage in a short-lived session by sending the access token [a2] before the expiration of the token pair (B). Thus, at block 212, the token manager 108 receives the access token [a2] from the client device 104. At block 214, the token manager 108 invalidates the refresh token [r1] and marks refresh token [r2] as the only valid refresh token at block 216.

At block 218, the server computer 102 provides the client device 104 with access to the network resource. At block 220, the token manager 108 logs the changes to the token log (e.g., invalidation of [r1] and validation of [r2] as the only valid refresh token).

Returning to block 210, the process for handling refresh operations will now be described. As indicated above, token pair (B) has been transmitted but may or may not have been received by the client device 104. Thus, the server computer 102 will accept either of valid refresh tokens [r1] or [r2]. At block 222, the token manager 108 receives a valid refresh token (i.e., one of [r1] and [r2]) as part of a second refresh operation.

At block 224, the token manager 108 maintains the refresh token presented by the client device 104 as valid and also invalidates the refresh token that was not presented as part of the second refresh operation. Thus, for example, if [r1] is presented by the client device 104 as part of the second refresh operation, the token manager maintains the refresh token [r1] as valid and invalidates refresh token [r2]. Likewise, if [r2] is presented by the client device as part of the second refresh operation, the token manager 108 maintains the refresh token [r2] as valid, and invalidates the refresh token [r1].

At block 226, the token manager 108 generates a new token pair (C) having a new access token [a3] and a new refresh token [r3]. The new refresh token [r3] is marked as a valid refresh token.

At block 228, the new token pair (C) is transmitted to the client device 104, and the activities transpiring in response to the refresh operation are logged in the token log at block 220. It will be understood that the features in blocks 222-228 may be iteratively performed for each refresh operation implemented by the client device 104.

Turning now to FIG. 3, the events logged in FIG. 2 are collected by the token manager 108 and associated with an identifier of the client device (or end user of the client device) at block 402.

Using the logged events, and for each of the valid refresh tokens at a particular point in time, the token manager 108 determines incidences in which the valid refresh tokens received at the server computer 102 from the client system 104 were not the most recently generated, but still valid, refresh tokens. For example, suppose [r1] and [r2] are valid at time t1, and [r1] (which was generated earlier in time than [r2]) is presented to the server computer 102.

The frequency of the incidences (e.g., the number or percentage) and/or the magnitude of the incidences are compared to a predefined frequency threshold at block 406. A magnitude may be determined by assessing how far removed the refresh token sent by the client device 104 is from the most recently generated refresh, such as when the same refresh token is sent multiple times, each time resulting in the server computer 102 generating a new token pair and invalidating the previously generated token pair, in a loop pattern. This scenario may occur, e.g., when the client device 104 continues to present the same refresh token to the server computer 102 because it has not received an updated token pairs. A risk value is assigned to the token pairs identified in the incidences and/or the client identifier based on the comparison at block 408. It will be understood that other contextual attributes of the request such as IP reputation, browser/device fingerprints, device integrity (e.g., is the device running known malware or jailbroken/rooted) may affect the 'risk' of the operation, and may be used in the analysis or risk.

At block 410, the token manager 108 determines whether the risk value has met a predefined risk threshold. If not, the token manager 108 may continue to collect logged events, and the process may return to block 402. Otherwise, if the risk value is greater than or equal to the predefined risk threshold, the token manager 108 is configured to perform one or more functions. For example, a notification to the client device 104 may be triggered requesting the client device 104 to re-register for access to the resource. In another example, a client device identifier and/or related token pairs may be flagged as compromised. A compromise may indicate that an unauthorized entity has intercepted a token pair and is attempting access to the resource.

Figure 4:
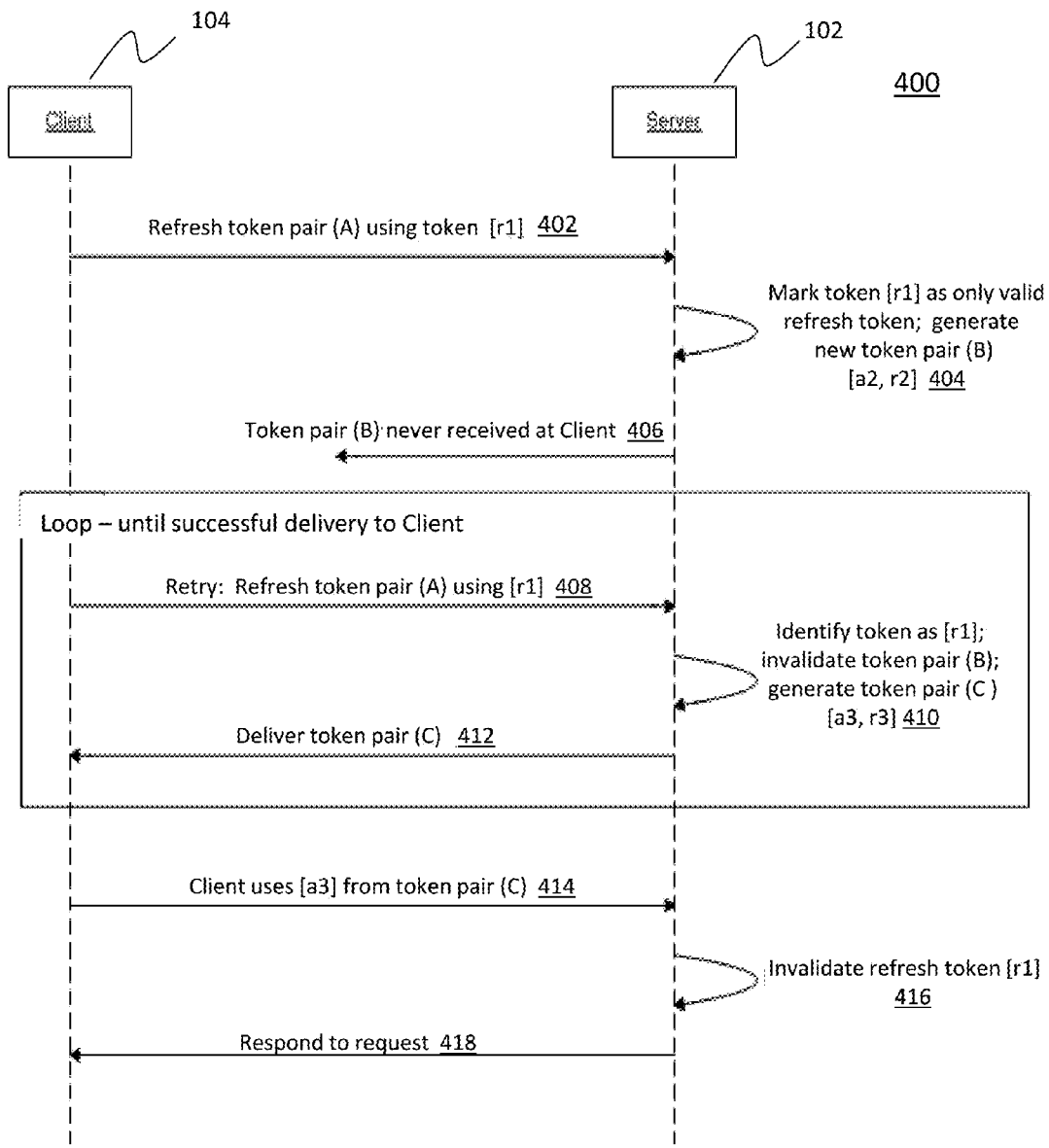
FIG. 4 is a sequence diagram illustrating a communication flow between a client device and a server computer for providing recovery from rolling security token loss and associated risk management according to an embodiment.

Turning now to FIG. 4, sequence diagram 400 illustrating a sample communication flow between a client device 104 and a server computer 102 will now be described. The sequence 400 of FIG. 4 assumes that the client device 104 has registered and has received a token pair (A) comprising an access token [a1] and a refresh token [r1].

The client device 104 attempts to refresh the token pair (B) with the server computer 102 (402). The server computer 102 tags the refresh token [r1] as the only valid refresh token (404), since it is the first refresh token issued and presented by the client device 104. The server computer also generates a new token pair (B) (404) as part of the refresh operation. At this time, there are two valid refresh tokens [r1] and [r2]. The server computer 102 sends the token pair (B) to the client device 104 (406), which is not received by the client device 104.

A sequence of steps in a loop is performed until successful delivery of a token pair to the client device has occurred. The loop includes a refresh operation by the client device 104 using the refresh token [r1] of token pair (A) (408), which is not the most recently generated token pair, thereby indicative that the token pair B was not successfully transmitted to the client device 104. The server computer 102 identifies the refresh token as [r1] and invalidates [r2] of token pair (B) (410). The server computer 102 generates a new token pair (C) that comprises [a3] and [r3] (410), and sends the token pair (C) to the client device 104 (412).

The client device 104 uses the refresh token [r3] of token pair (C) as part of a third refresh operation (414). The server computer 102 identifies the refresh token as [r3], invalidates the refresh token [r1] (416), and responds to the client device's request (418).

Technical effects and benefits include managing token pairs used in providing access to various resources. A most recently validated token pair is stored along with a most recently generated token pair. Two token pairs are maintained by the system, while only one token pair is available for use at any time. The opportunity for reuse of an old token is diminished since an older validated token pair becomes invalidated as soon as the system determines that a newly generated token pair has been received by the client. Risk analysis enables the system to identify potential risks involved with refresh operations that use the same token pair despite recurrent refresh operations performed.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
storing, in a memory device accessible by a server computer, a token pair (B) transmitted to a client device, the token pair (B) comprising an access token (a2) and a refresh token (r2), the token pair (B) generated as part of a refresh operation;
storing, in the memory device, a refresh token (r1) that was generated by the server computer before generation of the token pair B, the refresh token (r1) and the refresh token (r2) each tagged as a valid refresh token;
receiving, at the server computer, a request to access a network resource, the request including the access token (a2);
invalidating the refresh token (r1); and
providing the client device with access to the network resource.

2. The method of claim 1, further comprising:
receiving the refresh token (r2) as part of a third refresh operation by the client device, wherein a previously-implemented second refresh operation resulted in transmission by the server computer of a new token pair (C) comprising an access token (a3) and a refresh token (r3), wherein receipt of the refresh token (r2) at the server computer indicates that the token pair (C) was not successfully delivered to the client device;
generating a new token pair (D) comprising an access token (a4) and a refresh token (r4);
transmitting the new token pair (D) to the client device;
invalidating the refresh token (r3); and
tagging the refresh token (r4) as a valid refresh token.

3. The method of claim 2, further comprising:
storing an identifier of the client device in a client record;
logging, in the client record, a timestamp of receipt and an identifier of each of a plurality of refresh tokens received at the server computer from the client device;
logging, in the client record, a timestamp of generation and an identifier of each of a plurality of token pairs generated by the server computer;
determining, based on collective timestamps of receipt and generation, incidences in which a subset of the plurality of refresh tokens received from the client device were determined to be those of corresponding pairs of valid refresh tokens having timestamps that are earlier in time than others in the corresponding pairs of the valid refresh tokens;
comparing a frequency of the incidences to a frequency threshold value; and
assigning a risk value to each of the plurality of token pairs in the subset based on the comparing.

4. The method of claim 3, further comprising:
upon determining the risk value exceeds a risk threshold value, transmitting notification to the client device to re-register for access to the network resource.

5. The method of claim 1, further comprising
receiving the refresh token (r2) from the client device as part of a second refresh operation;
generating a new token pair (C) comprising an access token (a3) and a refresh token (r3);
transmitting the new token pair (C) to the client device;
tagging the refresh token (r3) as a valid refresh token; and
maintaining the refresh token (r2) as a valid refresh token.

6. The method of claim 1, wherein each of the token pairs is short-lived.

7. The method of claim 1, wherein the client device is a mobile device.

* * * * *